(12) United States Patent
Robotham et al.

(10) Patent No.: US 8,762,870 B2
(45) Date of Patent: Jun. 24, 2014

(54) MULTIFUNCTION DRAG-AND-DROP SELECTION TOOL FOR SELECTION OF DATA OBJECTS IN A SOCIAL NETWORK APPLICATION

(75) Inventors: Stephanie Robotham, Oxfordshire (GB); Alan O'Connor, Dublin (IE); William Gradin, San Francisco, CA (US); Christopher De Gour, San Jose, CA (US); Marcos Solari, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 84 days.

(21) Appl. No.: 13/403,914

(22) Filed: Feb. 23, 2012

(65) Prior Publication Data

US 2013/0024795 A1    Jan. 24, 2013

Related U.S. Application Data

(60) Provisional application No. 61/509,440, filed on Jul. 19, 2011.

(51) Int. Cl.
*G06F 3/048* (2013.01)
*G06F 3/0486* (2013.01)
*G06F 3/0481* (2013.01)
*G06F 9/44* (2006.01)

(52) U.S. Cl.
CPC .......... *G06F 3/0486* (2013.01); *G06F 3/0481* (2013.01); *G06F 9/4443* (2013.01)
USPC ............... 715/769; 726/7; 715/753; 715/224; 715/853; 715/752; 709/206

(58) Field of Classification Search
CPC .... G06F 3/0486; G06F 3/0481; G06F 9/4443
USPC .......................................... 715/769
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

USPTO, Final Office Action, for U.S. Appl. No. 13/074,809, mailed Feb. 14, 2013.

(Continued)

*Primary Examiner* — Tuyetlien Tran
*Assistant Examiner* — Jaime Duckworth
(74) *Attorney, Agent, or Firm* — Ingrassia Fisher & Lorenz, P.C.

(57) ABSTRACT

A computer-implemented method of managing functions for objects associated with an interactive application presented on a display begins by providing a plurality of images that represent different selectable objects. The method also provides a drag-and-drop graphical user interface (GUI) element to accommodate drag-and-drop selection from the plurality of images, the drag-and-drop GUI element having a control element to initiate a function. The method continues by populating the drag-and-drop GUI element with a first image that represents a first selectable object, and thereafter receiving a command in response to activation of the control element. In response to receiving the command, the method performs the function on the first selectable object.

17 Claims, 13 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,281,022 B2 | 10/2007 | Gruhl et al. |
| 7,340,411 B2 | 3/2008 | Cook |
| 7,373,599 B2 | 5/2008 | McElfresh et al. |
| 7,406,501 B2 | 7/2008 | Szeto et al. |
| 7,426,557 B2 | 9/2008 | Gruhl et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,685,091 B2 | 3/2010 | Boone et al. |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,933,843 B1 | 4/2011 | von Groll et al. |
| 7,945,653 B2 | 5/2011 | Zuckerberg et al. |
| 7,970,895 B2 | 6/2011 | Gruhl et al. |
| 7,974,983 B2 | 7/2011 | Goeldi |
| 7,991,764 B2 | 8/2011 | Rathod |
| 8,005,896 B2 | 8/2011 | Cheah |
| 8,010,539 B2 | 8/2011 | Blair-Goldensohn et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0256905 A1 | 11/2005 | Gruhl et al. |
| 2005/0256949 A1 | 11/2005 | Gruhl et al. |
| 2006/0200444 A1 | 9/2006 | Bracho et al. |
| 2006/0284873 A1 | 12/2006 | Forrest et al. |
| 2007/0214097 A1 | 9/2007 | Parsons et al. |
| 2007/0233656 A1 | 10/2007 | Bunescu et al. |
| 2007/0239452 A1 | 10/2007 | Madhavan et al. |
| 2008/0010270 A1 | 1/2008 | Gross |
| 2008/0082399 A1 | 4/2008 | Noble et al. |
| 2008/0082586 A1 | 4/2008 | Jasik et al. |
| 2008/0147487 A1 | 6/2008 | Hirshberg |
| 2008/0154798 A1 | 6/2008 | Valz |
| 2008/0195961 A1* | 8/2008 | Bae et al. ............... 715/769 |

(56) References Cited

U.S. PATENT DOCUMENTS

| | | |
|---|---|---|
| 2008/0209320 A1 | 8/2008 | Mawhinney et al. |
| 2008/0228695 A1 | 9/2008 | Sifry et al. |
| 2008/0288516 A1 | 11/2008 | Hadfield |
| 2009/0018996 A1 | 1/2009 | Hunt et al. |
| 2009/0138427 A1 | 5/2009 | Kalavade |
| 2009/0204507 A1 | 8/2009 | Cockayne et al. |
| 2009/0222743 A1 | 9/2009 | Hadfield |
| 2009/0319518 A1 | 12/2009 | Koudas et al. |
| 2010/0057682 A1* | 3/2010 | Ramsay et al. .................... 707/3 |
| 2010/0063877 A1 | 3/2010 | Soroca et al. |
| 2010/0063959 A1 | 3/2010 | Doshi et al. |
| 2010/0070485 A1 | 3/2010 | Parsons et al. |
| 2010/0088234 A1 | 4/2010 | Moore et al. |
| 2010/0094878 A1 | 4/2010 | Soroca et al. |
| 2010/0125502 A1 | 5/2010 | Solomon et al. |
| 2010/0217757 A1 | 8/2010 | Fujioka |
| 2010/0241576 A1 | 9/2010 | Beeri |
| 2010/0274815 A1 | 10/2010 | Vanasco |
| 2011/0041153 A1 | 2/2011 | Simon et al. |
| 2011/0209067 A1 | 8/2011 | Bogess et al. |
| 2011/0246816 A1 | 10/2011 | Hsieh et al. |
| 2011/0256907 A1* | 10/2011 | Lee et al. ...................... 455/566 |
| 2011/0258204 A1 | 10/2011 | Hubbard et al. |
| 2011/0270923 A1* | 11/2011 | Jones et al. .................... 709/204 |
| 2012/0023455 A1* | 1/2012 | Chen et al. .................... 715/853 |
| 2012/0296920 A1 | 11/2012 | Sahni et al. |

OTHER PUBLICATIONS

USPTO, Notice of Allowance, for U.S. Appl. No. 13/526,246, mailed Feb. 14, 2013.

USPTO, Notice of Allowance, for U.S. Appl. No. 12/356,429, mailed Feb. 15, 2013.

Linear Combination—Wikipedia (http://en.wikipedia.org/wiki/Linear_Combination (accessed Jul. 16, 2012).

Final Office Action for U.S. Appl. No. 12/437,418, mailed Apr. 16, 2012.

Final Office Action for U.S. Appl. No. 12/356,429, mailed May 2, 2012.

Notice of Allowance for U.S. Appl. No. 12/819,402, mailed May 14, 2012.

Non-Final Office Action for U.S. Appl. No. 13/453,802, mailed Jun. 8, 2012.

United States Patent Office, U.S. Non-Final Office Action for U.S. Appl. No. 12/278,277 dated Sep. 14, 2012.

United States Patent Office, U.S. Non-Final Office Action for U.S. Appl. No. 13/074,809 dated Oct. 3, 2012.

U.S. Appl. No. 13/478,002, filed May 22, 2012.

* cited by examiner

MULTIFUNCTION DRAG-AND-DROP SELECTION TOOL FOR SELECTION OF DATA OBJECTS IN A SOCIAL NETWORK APPLICATION

CROSS-REFERENCE TO RELATED APPLICATION(S)

This application claims the benefit of U.S. provisional patent application Ser. No. 61/509,440, filed Jul. 19, 2011.

TECHNICAL FIELD

Embodiments of the subject matter described herein relate generally to graphical user interfaces (GUIs). More particularly, embodiments of the subject matter relate to a drag-and-drop GUI element that accommodates selection of users and other data objects for performing various functions associated with the operation of an application, such as a social networking application.

BACKGROUND

Social network applications, systems, and services are becoming increasingly popular. An online consumer based social network application (such as the FACEBOOK social network application or the TWITTER social network application) can be customized for use by a private enterprise. Alternatively, a social network application can be specifically designed and configured for use in an enterprise environment. Social networks often handle large amounts of data for each user, because each user can contribute, collaborate, and share information with other social network users. In the enterprise environment, this information can include postings on the status of a deal or project, short summaries of what the posting user is doing, and/or public online conversations about a certain topic on a feed or "wall."

A social network application may support a variety of communication, posting, and relationship management features and functions. For example, a social network application might allow users to communicate with one another using private messages, public postings, email, live chatting, or the like. As another example, a social network application might support the creation and maintenance of user groups. The creation and sending of communications, the creation of groups, and the addition of users to a group can be time consuming and cumbersome in many social network applications. For example, a conventional social network application may require a sender to perform multiple "send" operations to communicate a common message to a plurality of recipients. As another example, a conventional social network application may require a group coordinator to painstakingly search for users and then enter the user names to establish a group.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
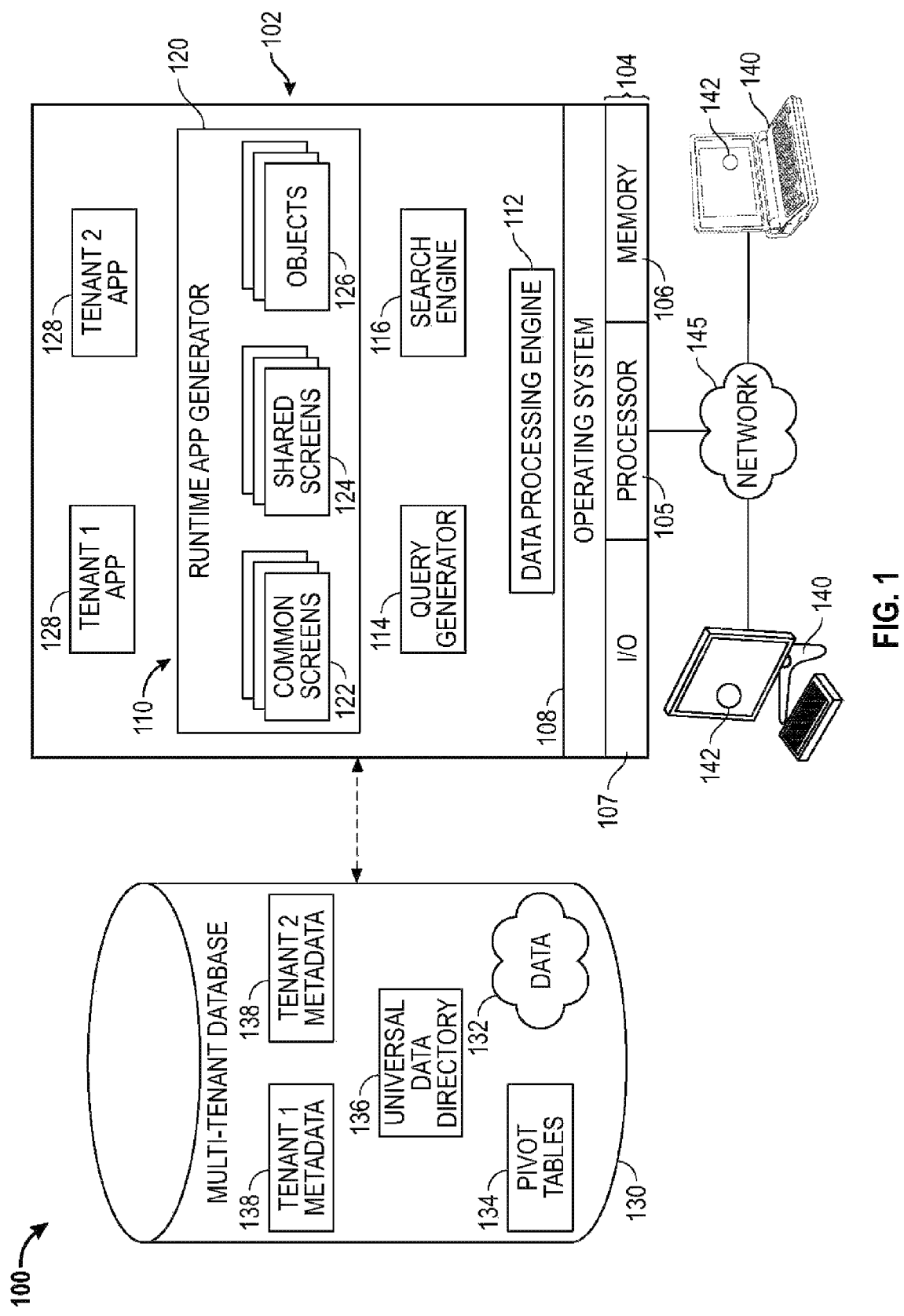
FIG. 1 is a block diagram of an exemplary multi-tenant data processing system.

The exemplary embodiments presented here relate to various graphical user interfaces (GUIs) suitable for use in a social network application provided by a computer-implemented system, such as a software-based system, a database system, a multi-tenant environment, or the like. The described subject matter could be implemented in connection with two or more separate and distinct computer-implemented systems that cooperate and communicate with one another. That said, in exemplary embodiments, the subject matter described herein is implemented in conjunction with a hosted virtual application in a multi-tenant environment.

More specifically, the subject matter presented here relates to various systems, techniques, and methods for managing, organizing, and processing data objects (such as users) in a social network. Disclosed herein is a system and method for organizing and connecting users in a social network. An exemplary implementation is the CHATTER application, a social network application offered by salesforce.com, inc.; however, a person having ordinary skill in the art will appreciate that other social networks may adopt one or more embodiments described herein, and that reference to the CHATTER application is not intended to limit this disclosure in any fashion.

In a social network setting, a first user can typically look up the profile of a second user and see who the second user is following, as well as who is following the second user. An enterprise social network may also offer this feature. However, it may also be useful to see where a particular user is within the organization's hierarchy. While that user may identify to whom he or she reports, and/or who his or her direct reports are, this is not often consistent, and relies upon a user's disclosure of this information. As such, there is no way to easily identify a user's role in an organization when using traditional social network services.

An exemplary embodiment is directed to using the social network service to build a full hierarchical organizational chart such that a user can navigate up and down through the organizational chart. In an embodiment, the social network organizational chart can be used to identify which users to follow and/or which users to not follow. In an embodiment, profile information for users can be displayed, either by directing to another profile page or providing a mouseover with profile information.

In an exemplary scenario, a first user can be following a second user and a third user. However, no connection exists between the second user and the third user. If the first user feels that the second user and third user would benefit by following each other, the first user can "connect" the second user and the third user, thereby functioning as a virtual social network matchmaker between to previously unconnected users. Moreover, an exemplary embodiment of a social network system enables objects, such as files, accounts, or groups to be followed. In an embodiment, a first user could cause previously unconnected objects to follow one another, such that users following the previously unconnected objects would then be able to receive social network posts from those objects. In an embodiment, the ability to create such connections may be limited to users having sufficient privileges.

In accordance with an exemplary embodiment, a first user may simultaneously connect to a plurality of users. For example, a GUI element may provide a box for quickly forming groups of users, whereby dragging user icons (or avatars) into the box automatically creates a group or causes a user to follow all users in the box. In certain implementations, the GUI element includes a box for performing multiple functions, including but not limited to: connecting users; adding users to a group; and posting comments or objects. In this regard, the individual social network users can be connected to each other via their respective profile pages or "feeds" on their respective profile pages. For example, an introduction may be sent from a first user to a plurality of users that will post to each of the plurality of users' feeds, thereby providing "one-click" connectivity to a plurality of users that may or may not have previously been following each other. The GUI element may also be used to add one or more users to a newly formed or previously existing group of users. Comments, files, or other data objects can be posted to one or more users simultaneously by dragging the respective avatars to the box and clicking a button to "post to wall" or to otherwise initiate the posting procedure.

The figures include schematic representations of screenshots to illustrate various embodiments of this disclosure. Neither these screenshots, nor the examples given herein are intended to limit this disclosure in any fashion.

Turning now to FIG. 1, an exemplary multi-tenant application system 100 suitably includes a server 102 that dynamically creates virtual applications 128 based upon data 132 from a common database 130 that is shared between multiple tenants. Data and services generated by the virtual applications 128 are provided via a network 145 to any number of user devices 140, as desired. Each virtual application 128 is suitably generated at run-time using a common application platform 110 that securely provides access to the data 132 in the database 130 for each of the various tenants subscribing to the system 100. In accordance with one non-limiting example, the system 100 may be implemented in the form of a multi-tenant customer relationship management system that can support any number of authenticated users of multiple tenants.

A "tenant" or an "organization" generally refers to a group of users that shares access to common data within the database 130. Tenants may represent customers, customer departments, business or legal organizations, and/or any other entities that maintain data for particular sets of users within the system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like. The server 102 typically includes or cooperates with some type of computer-readable media, where a tangible computer-readable medium has computer-executable instructions stored thereon. The computer-executable instructions, when read and executed by the server 102, cause the server 102 to perform certain tasks, operations, functions, and processes described in more detail herein. In this regard, the memory 106 may represent one suitable implementation of such computer-readable media. Alternatively or additionally, the server 102 could receive and cooperate with computer-readable media (not separately shown) that is realized as a portable or mobile component or platform, e.g., a portable hard drive, a USB flash drive, an optical disc, or the like.

The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the user devices 140. The virtual applications 128 are typically generated at run-time in response to queries received from the user devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user devices 140. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its user device 140, as appropriate.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user that initiated the request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc. In certain embodiments, the data processing engine 112 and the processor 105 cooperate in an appropriate manner to perform and manage various techniques, processes, and methods associated with the generation, provision, manipulation and/or operation of GUIs and GUI elements, as described in more detail below with reference to FIGS. 2-13.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith. In an exemplary embodiment, each object type includes one or more fields for indicating the relationship of a respective object of that object type to one or more objects of a different object type (e.g., master-detail, lookup relationships, or the like).

As described in greater detail below in the context of FIGS. 2-13, in exemplary embodiments, the application platform 110, the data processing engine 112, the query generator 114, and the processor 105 cooperate in an appropriate manner to process data associated with a hosted virtual application 128 (such as a social network application), generate and provide suitable GUIs (such as web pages) for presenting the data on client devices 140, and perform additional techniques, processes, and methods to support the features and functions related to the management and presentation of forecast data in the multi-tenant application system 100.

Still referring to FIG. 1, the data and services provided by the server 102 can be retrieved using any sort of personal computer, mobile telephone, portable device, tablet computer, or other network-enabled user device 140 that communicates via the network 145. Typically, the user operates a conventional browser or other client program 142 to contact the server 102 via the network 145 using, for example, the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. As noted above, the virtual application 128 may contain Java, ActiveX, or other content that can be presented using conventional client software running on the user device 140; other embodiments may simply provide dynamic web or other content that can be presented and viewed by the user, as desired.

A computer-based system, such as the system 100 described above, can be configured to provide an interactive GUI for an application that handles a variety of data objects. Depending upon the particular embodiment, the application may be a hosted virtual application for one of a plurality of different tenants, such as a web-based customer relationship management application, a social network application intended for consumer use, a social network intended for enterprise use, an intranet portal application, or a combination thereof. One exemplary embodiment presented here relates to an enterprise social network application that can be deployed for use by employees of a company or any designated organization. Thus, although the following description refers to a series of exemplary screenshots associated with an interactive enterprise social networking application, the concepts, techniques, and features presented here can be equivalently applied in the context of other applications and systems that generate and display interactive GUIs.

The user devices 140 shown in FIG. 1 include conventional and well-known elements that are explained only briefly here. For example, each user device 140 could be realized as a desktop personal computer, workstation, laptop, mobile device, smartphone, tablet computer, or any other computing device capable of interfacing directly or indirectly to the Internet or other network connection. Each user device 140 typically runs an HTTP client, e.g., a web browser program, module, or application that allows the user (e.g., subscriber of the multi-tenant database system) to access, process, and view information, pages, and applications available to it from over a network. Each user device 140 also typically includes one or more user interface devices, such as a keyboard, a mouse, trackball, touch pad, touchscreen, pen or the like, for interacting with the GUIs provided by the browser on a display (e.g., a monitor screen, LCD display, etc.). Although certain embodiments are suitable for use with the Internet, it should be understood that other networks can be used instead of the Internet, such as an intranet, an extranet, a virtual private network (VPN), a non-TCP/IP based network, any LAN or WAN or the like.

Figure 2:
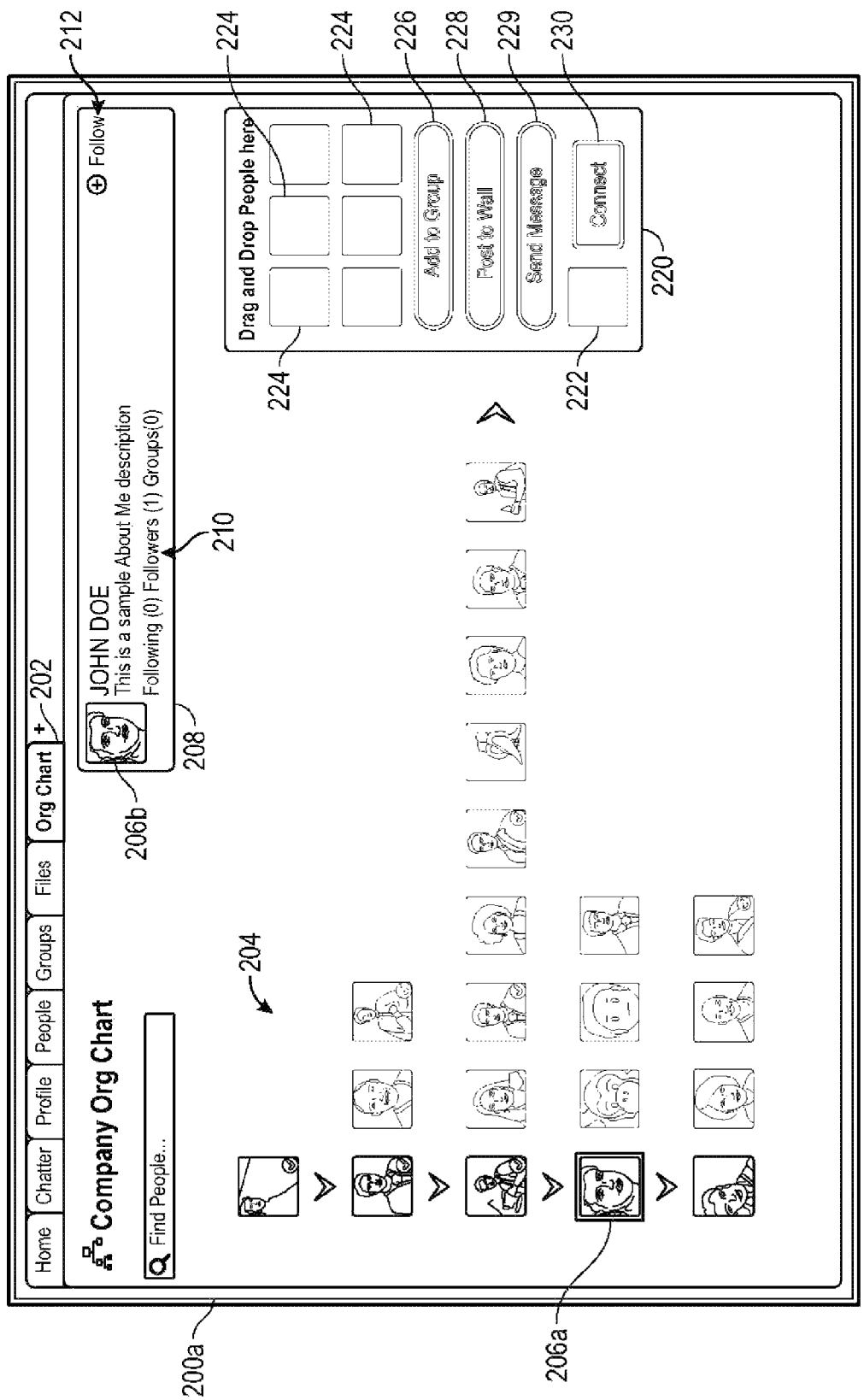
FIGS. 2-9 illustrate various GUIs and related GUI elements presented by a hosted application.

FIG. 2 represents an exemplary GUI 200 that can be generated and provided in the form of a web page for display using a user device such as any of the user devices 140 shown in FIG. 1. The illustrated embodiment of the GUI 200 is displayed in connection with an organization chart tab 202 (labeled "Org Chart"), which may be one of a plurality of selectable tabs available to the user. Accordingly, the GUI 200 includes an interactive and dynamic representation of an organization chart 204 for the user's company, enterprise, organization, or entity (hereinafter referred to as "organization" for ease of description). The organization chart 204 includes images that represent different users or people within the user's organization. Thus, each displayed image may represent one of the users of the hosted virtual application. The graphical organization chart 204 contained in the GUI 200 is arranged in accordance with a hierarchical structure that corresponds to the hierarchy of the people represented by the images. For this particular embodiment, a user within the organization has at most one manager. Consequently, each user object maintained by the system has a designated "Manager" and the designated "Manager" fields can be used to construct and arrange the organization chart 204.

The images displayed in connection with the organization chart 204 may include, without limitation: pictures; avatars; icons; sketches; animations; cartoons; and/or anything intended to graphically represent the users. Ideally, photographs are used so that the user can quickly and easily recognize the members of the organization. For the state of the GUI 200a depicted in FIG. 2, a selected user image 206a in the organization chart 204 is highlighted, outlined, or otherwise rendered in a visually distinguishable manner to indicate its selected status. Selection of a user image causes the GUI 200a to be refreshed such that the selected user image 206b also appears in an "About Me" field 208. The "About Me" field 208 includes a brief description about the user depicted in the selected user image 206. The "About Me" field 208 may also include status information 210 associated with the selected user. For example, the status information 210 may indicate the number of people that the selected user is following, the number of people that are following the selected user, the number of groups of which the selected user is a member, etc. The "About Me" field 208 can reflect any data stored in connection with that particular user's profile. Accordingly, the "About Me" field 208 could be used to show badges, awards, tenure, hobbies, or the like. Moreover, the content, configuration, and functionality of the "About Me" field 208 can evolve as the product evolves, and it is intended for the user to show other people in the social network what they do for the company, what skills and experiences they have, and/or to share personal facts and achievements as they see fit so other people in the social network can get to know them better.

The illustrated embodiment of the "About Me" field 208 also includes a control 212 that can be activated by the user to follow the selected user (or to stop following the selected user). Notably, the content of the "About Me" field 208, including the corresponding image, is updated and refreshed in a dynamic and responsive manner as the user navigates and "clicks through" the displayed organization chart 204. Moreover, dragging and dropping of user images does not change the image or content of the "About Me" field 208.

It should be appreciated that the images in the GUI 200 need not always be arranged in accordance with an organization chart structure. For example, the user images could instead be displayed as at least a portion of a personnel directory arranged in alphabetical order, arranged by department, arranged by office location, or the like. As another example, the user images could be displayed in designated or defined groups that are maintained by the system. As yet another example, the user images could be displayed in connection with a contacts list, a friend list, or the like.

The exemplary embodiment of the GUI 200a shown in FIG. 2 also includes an interactive user selection element that accommodates the selection of one or more users for purposes of performing at least one operation or function. Although not always required, the user selection element described here is realized as a drag-and-drop GUI element 220 to accommodate drag-and-drop selection using the displayed images. The illustrated embodiment of the drag-and-drop GUI element 220 includes, without limitation: a primary selection field 222; multiple secondary selection fields 224; and at least one control element to initiate one or more functions, operations, or procedures. In preferred embodiments, the drag-and-drop GUI element 220 is a multifunction element that supports a plurality of different functions. More specifically, the drag-and-drop GUI element 220 includes at least an "Add To Group" control 226, a "Post To Wall" control 228, a "Send Message" control 229, and a "Connect" control 230.

The overall shape, size, and arrangement of the drag-and-drop GUI element 220 may vary from that depicted in FIG. 2, as appropriate for the particular embodiment. For the exemplary embodiment presented here, the drag-and-drop GUI element 220 is rendered in a persistent manner concurrently with the user images in the GUI 200 whether or not it is being used. Moreover, the drag-and-drop GUI element 220 may be rendered in a semi-transparent, subdued, or otherwise less prominent manner when it is not being used (e.g., when no images have been dragged into it). In other embodiments, the drag-and-drop GUI element 220 can be selectively displayed as needed, perhaps by a "View" or a "Show" control button. In yet other embodiments, the drag-and-drop GUI element 220 can be automatically displayed whenever the user selects, highlights, or hovers over an image in the organization chart 204.

The primary selection field 222 of the drag-and-drop GUI element 220 is a solitary field that accommodates the selection (dragging and dropping) of only one user image. The reason for this solitary field will become apparent from the following description. In alternate embodiments, the primary selection field 222 could be supplemented with one or more additional selection fields if so desired. The illustrated embodiment of the drag-and-drop GUI element 220 includes six secondary selection fields 224 to accommodate the selection of six different user images. Of course, more or less than six secondary selection fields 224 could be provided if so desired. In practice, the drag-and-drop GUI element 220 could accommodate a flexible number of selection fields by providing a suitable control element, such as a scroll bar, a "page" switching feature, a drop-down menu, or the like. Alternatively or additionally, the drag-and-drop GUI element 220 could employ multiple tabs to provide additional selection capabilities.

The "Add To Group" control 226 can be activated to initiate a procedure to add one or more selected users to a designated group. Accordingly, activation of the "Add To Group" control 226 causes certain backend processes to accommodate the addition of the selected users to one or more group. The "Post To Wall" control 228 can be activated to initiate a procedure to post a message intended for one or more selected users. Accordingly, activation of the "Post To Wall" control 228 causes certain backend processes related to the generation and rendering of message postings to the "walls" (or to any area or field) maintained by the social networking application on behalf of the selected users. The "Connect" control 230 can be activated to initiate a procedure to connect selected users to each other. Accordingly, activation of the "Connect" control 230 causes certain backend processes related to the generation and rendering of introduction or invitation messages, the creation of links, associations, or relationships between users, and the like. These functions are described in more detail below with reference to FIGS. 4-13.

It should be appreciated that an implementation of the drag-and-drop GUI element 220 could support different functions, additional functions, and/or alternative functions if so desired. Indeed, the drag-and-drop GUI element 220 could be utilized in connection with one or more of the following functions, operations, and features, without limitation: messaging via email, private messages, instant messages, voicemail messages, or text messages; live chatting; web-based videoconferencing; web-based remote meetings; screen sharing; and the like. Moreover, the drag-and-drop GUI element 220 could be utilized to transmit files of any desired format (e.g., video, audio, text, etc.). In addition, the drag-and-drop GUI element 220 could be utilized to request a status update from another user, schedule a meeting, schedule a telephone call, send a sentiment, feedback, provide "points" (such as value points, review ratings, or anything that can be tallied, collected, or accumulated for any purpose). Accordingly, additional control elements could be rendered in connection with the drag-and-drop GUI element 220. In practice, the drag-and-drop GUI element 220 could accommodate a larger number of control elements by providing a scrollable menu of options, a popup window with multiple control elements, a "page" switching feature, a drop-down menu, or the like.

User images can be dragged and dropped using any number of UI techniques and technologies. Such techniques and technologies include, without limitation: a mouse, trackball, joystick, or other pointing device; a stylus; a remote control; finger gestures using a touchscreen; or the like. Although the GUI 200 is described here in the context of one exemplary implementation that utilizes drag-and-drop technology, alternate embodiments could support other selection techniques and technologies. For example, user images could be selected via a "right click" menu option, via a keyboard button command, or the like. It should be appreciated that the drag-and-drop interface is merely one preferred implementation that is not intended to limit or otherwise restrict the scope or application of the subject matter described herein.

Figure 3:
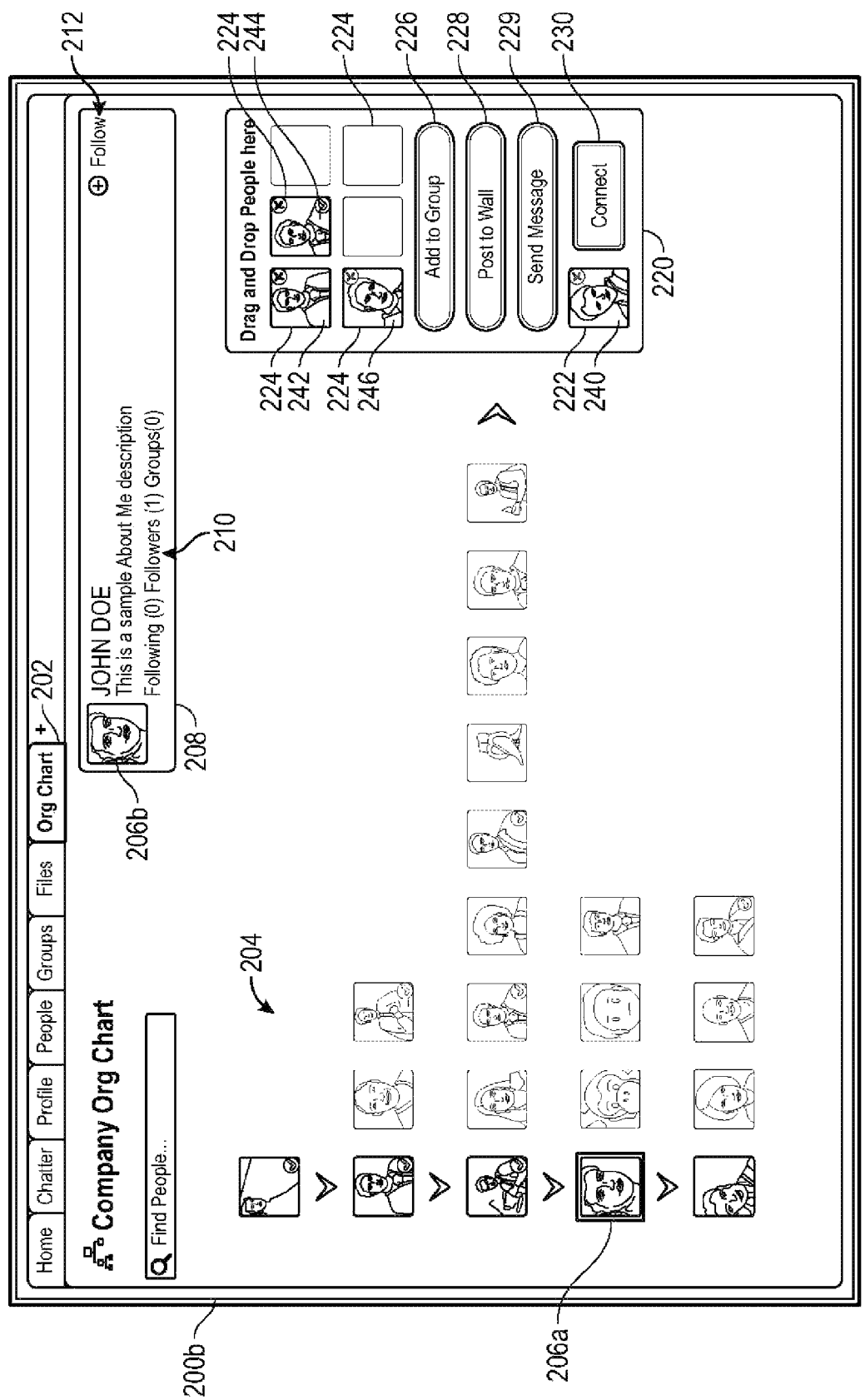

FIG. 3 depicts the state of the GUI 200b after four user images have been dragged and dropped from the organization chart 204 to corresponding selection fields in the drag-and-drop GUI element 220. For this particular embodiment, dragging and dropping a user image into the drag-and-drop GUI element 220 does not remove the user image from the organization chart 204 (although the user image in the organization chart 204 could be grayed out, faded out, made transparent, or otherwise rendered in a visually distinguishable manner to indicate that it has already been selected). For the illustrated example, the primary selection field 222 has been populated with a user image 240, and three of the secondary selection fields 224 have been populated with respective user images 242, 244, 246. The unused secondary selection fields 224 remain empty and ready to accommodate other selections if needed.

Certain characteristics of the drag-and-drop GUI element 220 change in response to the selection of one or more user images. For example, the various controls 226, 228, 230 are grayed out and configured to be inactive when no user images have been selected (see FIG. 2). In practice, the appearance and functionality of the controls 226, 228, 230 can be altered to reflect an active state when appropriate to do so. For example, the "Add To Group" control 226 and the "Post To Wall" control 228 are configured to be active when a user image has been dragged and dropped into any of the secondary selection fields 224, because the secondary selection fields 224 are designated for use with the "Add To Group" and "Post To Wall" functions. In contrast, the exemplary embodiment does not configure either the "Add To Group" control 226 or the "Post To Wall" control 228 to be active in response to the population of the primary selection field 222 by itself (i.e., without populating any of the secondary selection fields 224). For this particular embodiment, therefore, the "Connect" control 230 is configured to be active when: (1) a user image has been dragged and dropped into the primary selection field 222; and (2) at least one user image has been dragged and dropped into a secondary selection field 224. FIG. 3 depicts a state of the GUI 200b where all of the controls 226, 228, 230 are displayed and configured in their active states. Accordingly, the user can click on any of the controls 226, 228, 230 to perform the designated functions.

The user images in the drag-and-drop GUI element 220 may have certain features and characteristics associated therewith. For example, a selected user image can be rendered with a "Remove" or "Delete" control (such as a small "X" icon displayed in a corner of the user image) to accommodate removal of the selected user image from the drag-and-drop GUI element 220. Alternatively or additionally, the drag-and-drop GUI element 220 could allow the user to remove a selected user image by clicking on the image and pressing a "Delete" button (graphically displayed in the GUI, graphically rendered with a GUI based keyboard, or physically implemented on a hardware keyboard). Alternatively or additionally, the drag-and-drop GUI element 220 could allow the user to remove a selected user image by dragging it out of the displayed boundary of the drag-and-drop GUI element 220. As another feature, a selected user image can be displayed with an icon, symbol, or mark (such as a small checkmark displayed in a corner of the user image) that indicates a "Following" status. Thus, the user of the GUI 200 can quickly and easily determine whether or not he or she is following the person represented by the selected user image. As yet another feature, a selected user image can be provided with hover-over information or content that temporarily appears when the user moves a cursor, a stylus, or finger near or over the selected user image. The hover-over content may include, for example, the name, contact information, profile information, and/or title of the person represented by the selected user image.

Figure 4:
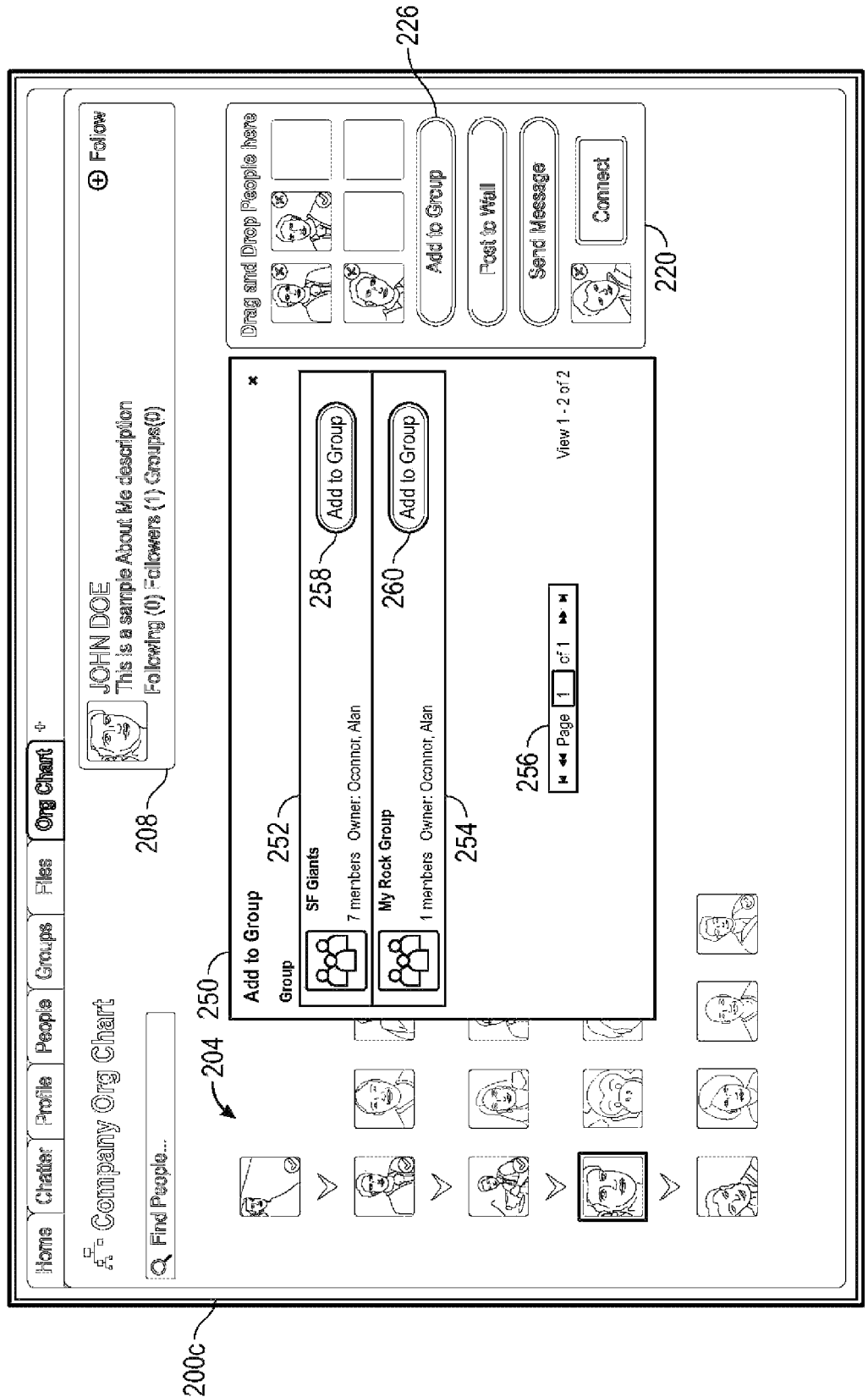

FIG. 4 depicts the state of the GUI 200c after the user has activated the "Add To Group" control 226. In response to activation of the "Add To Group" control 226, the GUI 200 is refreshed to display an "Add To Group" window 250, which may resemble a popup that obscures a portion of the underlying organization chart 204. If the user is not an owner or manager of any group maintained by the system, then the "Add To Group" window 250 may remain hidden or it may be displayed in an empty state with no entries. Alternatively or additionally, the GUI 200c could be generated to include a message or notification that indicates that no groups are currently available. This example assumes that the user is the owner or manager of two groups: "SF Giants" and "My Rock Group" (represented by respective group fields 252, 254). The "Add To Group" window 250 accommodates any number of groups, and a large number of groups can be listed using multiple pages if needed. Accordingly, the "Add To Group" window 250 includes a page selection control 256 to allow the user to view all of the available groups.

Figure 5:
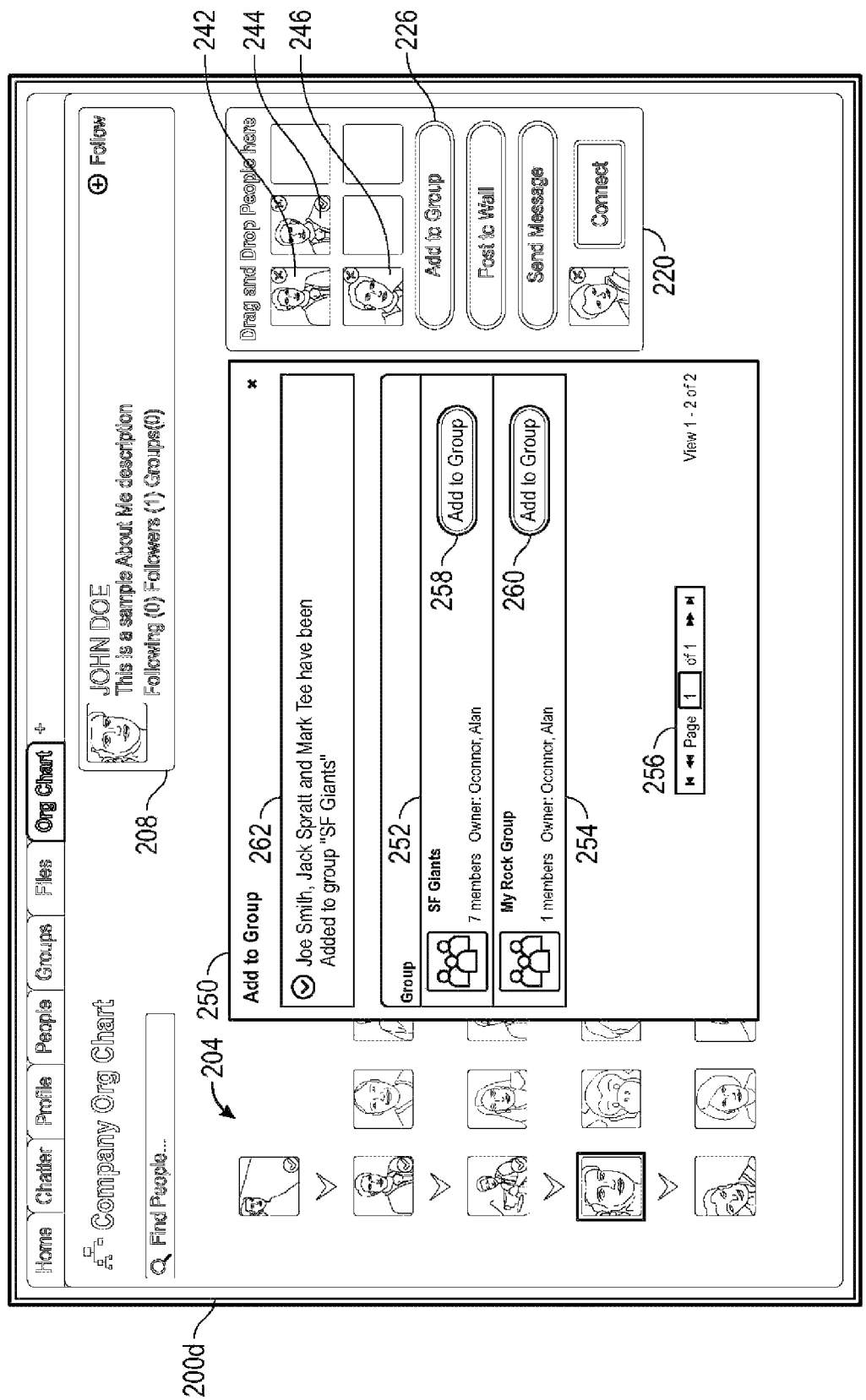

Each group field 252, 254 has a respective "Add To Group" control button 258, 260 that, when activated, causes the selected users to be added to the corresponding group. This example assumes that the user activates the "Add To Group" control button 258 located in the group field 252 for the "SF Giants" group, and that the system successfully carries out the corresponding procedure to add the three selected users to the "SF Giants" group. In this regard, FIG. 5 depicts the state of the GUI 200d after it has been refreshed to show a confirmation message 262 within the "Add To Group" window 250. The confirmation message 262 indicates that the three selected users (represented by the user images 242, 244, 246) have been successfully added to the "SF Giants" group. Although not always required, the confirmation message 262 identifies the newly added group members by name (e.g., Joe Smith, Jack Spratt, and Mark Tee). Notably, the group fields 252, 254 remain displayed in the "Add To Group" window 250 at this time. This allows the user to add the currently selected users to the "My Rock Group" group (listed in the group field 254) if so desired. The "Add To Group" window 250 can be closed to return the GUI 200 to its previous state (see FIG. 3).

Figure 6:
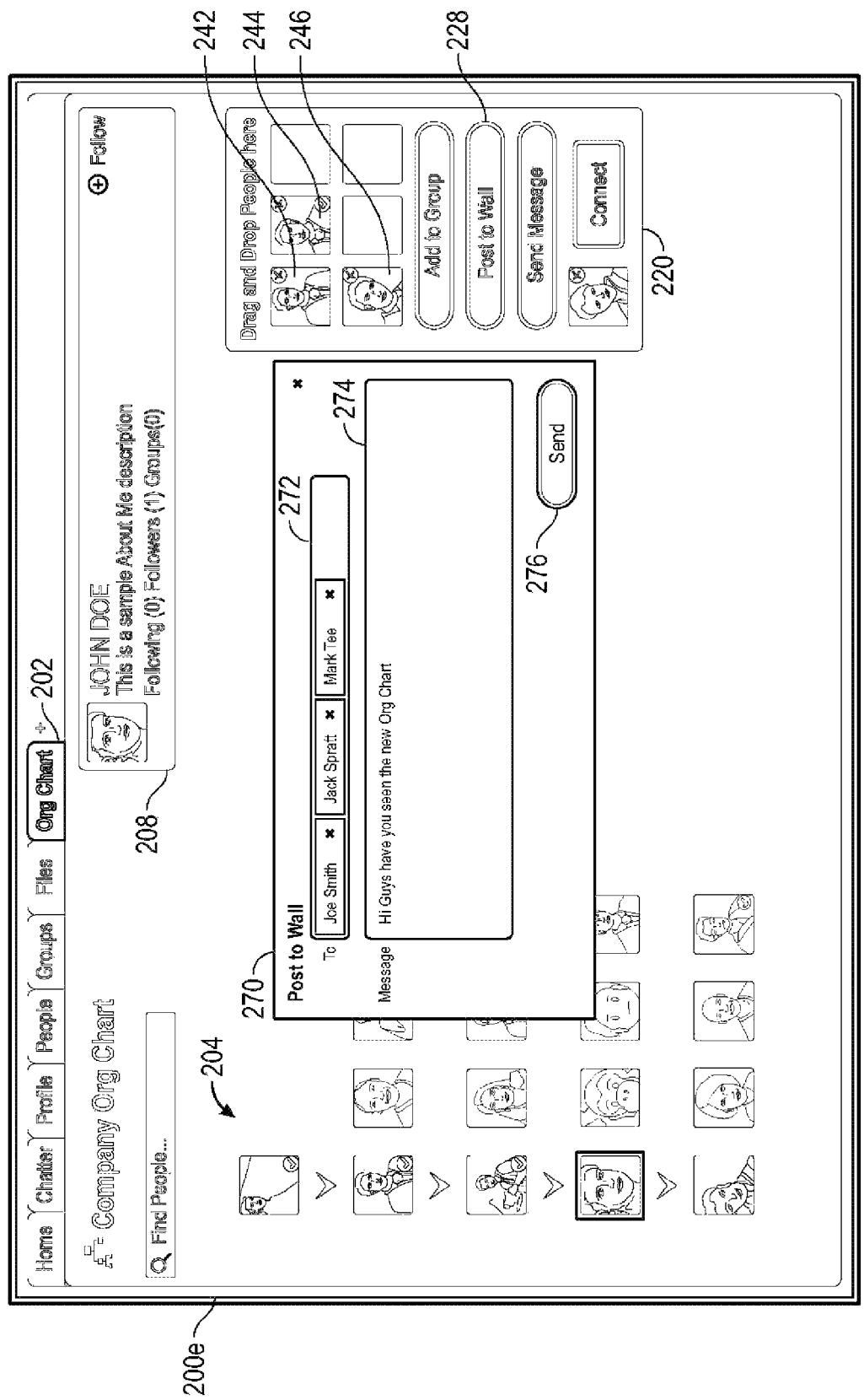

FIG. 6 depicts the state of the GUI 200e after the user has activated the "Post To Wall" control 228. In response to activation of the "Post To Wall" control 228, the GUI 200 is refreshed to display a "Post To Wall" window 270, which may resemble a popup that obscures a portion of the underlying organization chart 204. The "Post To Wall" window 270 includes a "To" field 272, a "Message" field 274, and a "Send" control button 276. Notably, the "To" field 272 is automatically populated to identify the selected users as potential recipients of the message. For this example, therefore, the "To" field 272 includes respective entries for Joe Smith, Jack Spratt, and Mark Tee (the people represented by the user images 242, 244, 246 in the drag-and-drop GUI element 220). Each entry may be rendered with a "Remove" or "Delete" control (such as a small "X" icon displayed next to the person's name) to accommodate removal of the person from the "To" field 272. The "Message" field 274 accommodates entry of the message that is intended for the identified recipients.

Figure 7:
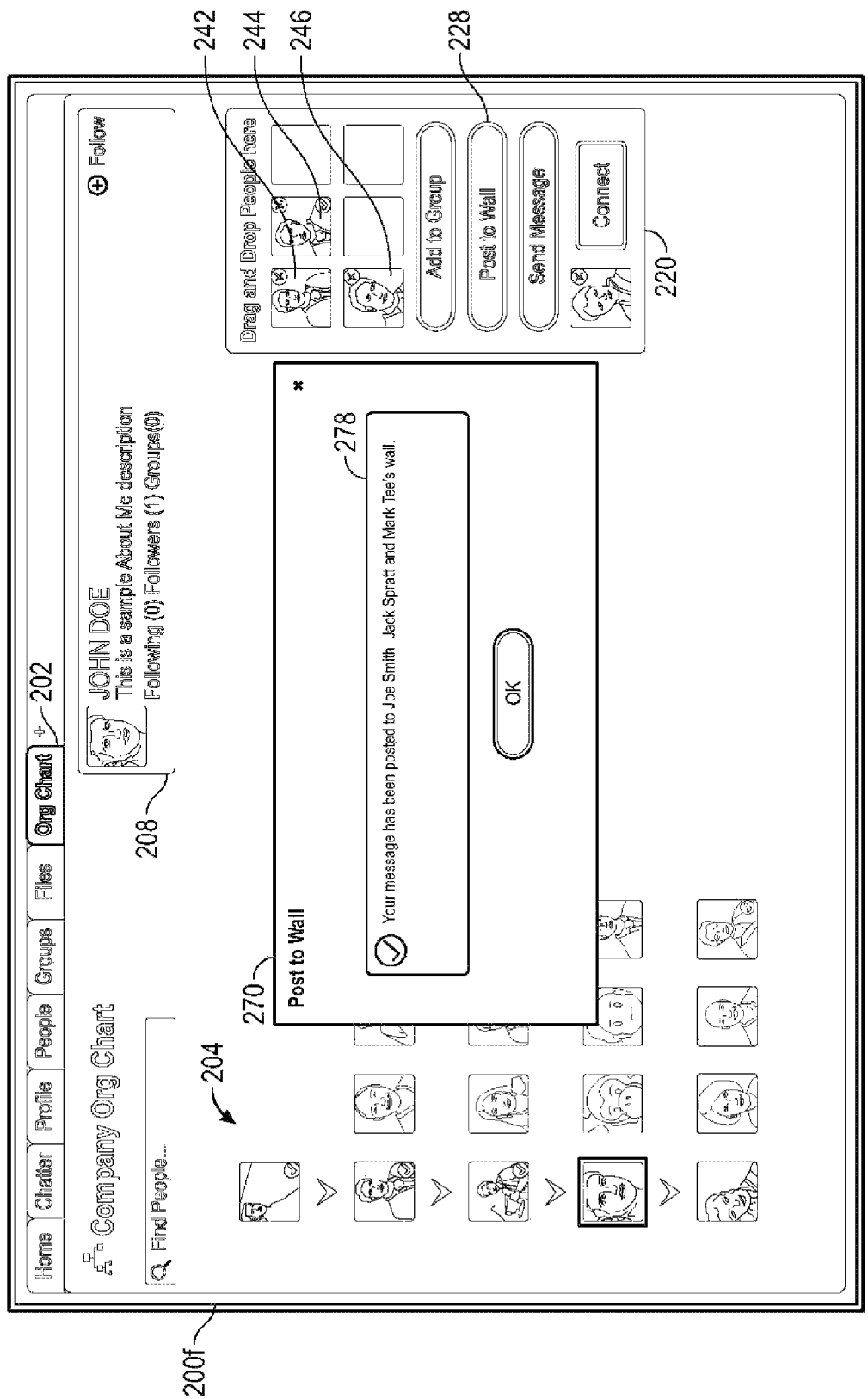

Activation of the "Send" control button 276 causes the entered message to be sent. In accordance with this particular social networking implementation, activation of the "Send" control button 276 posts the entered message on the wall of each recipient. This example assumes that the system successfully carries out the corresponding procedure to post the message. In this regard, FIG. 7 depicts the state of the GUI 200f after it has been refreshed to show a confirmation message 278 within the "Post To Wall" window 270. The confirmation message 278 indicates that the message has been posted to the walls of the three selected users (represented by the user images 242, 244, 246). Although not always required, the confirmation message 278 identifies the recipients by name (e.g., Joe Smith, Jack Spratt, and Mark Tee). The "Post To Wall" window 270 can be closed to return the GUI 200 to its previous state (see FIG. 3).

Figure 8:
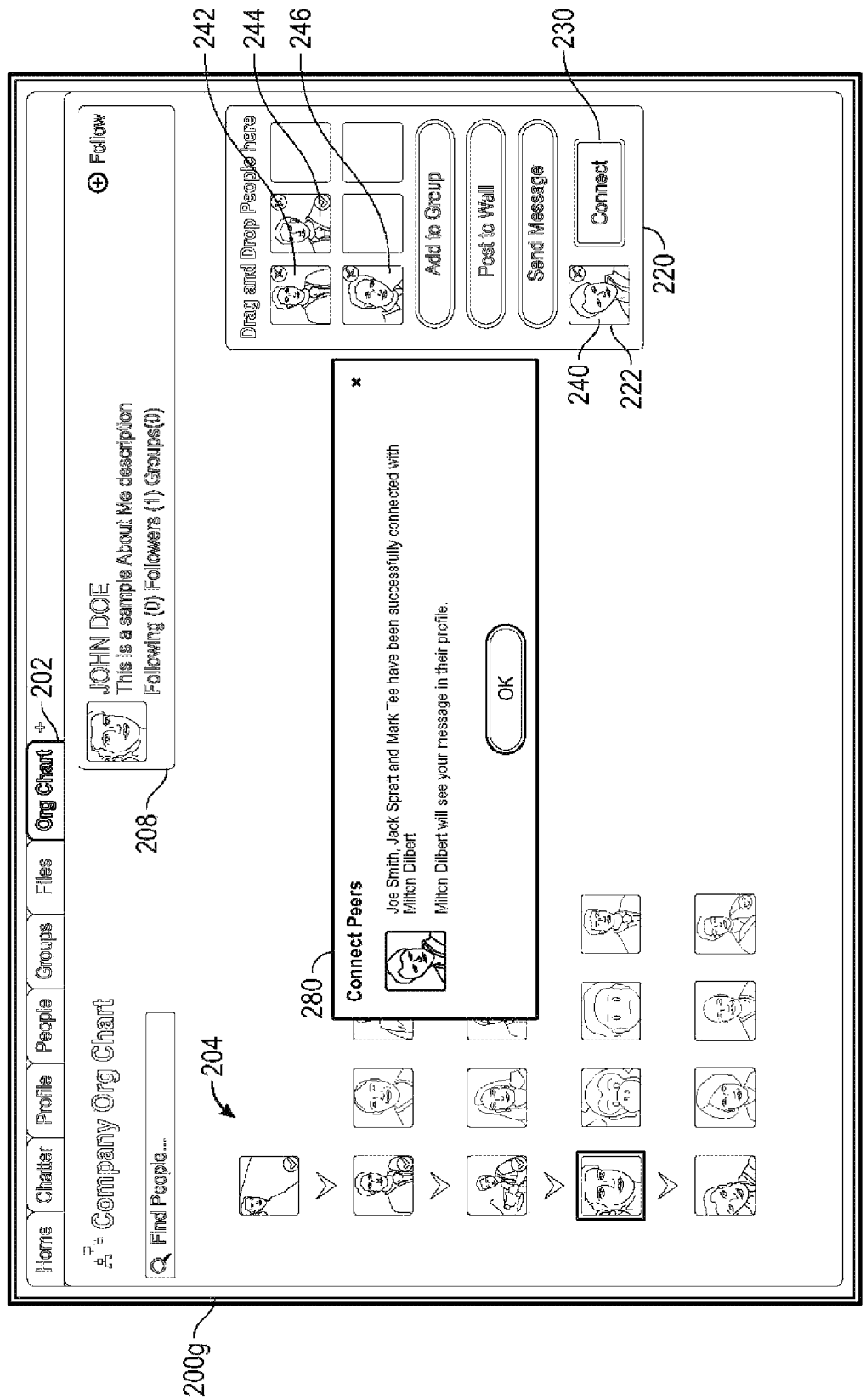

FIG. 8 depicts the state of the GUI 200g after the user has activated the "Connect" control 230. This example assumes that the system successfully performs the necessary backend processes to link the selected users together in some manner. In response to activation of the "Connect" control 230, the GUI 200 is refreshed to display a confirmation window 280, which may resemble a popup that obscures a portion of the underlying organization chart 204. The confirmation window 280 includes a message to notify the user that the three selected users (represented by the user images 242, 244, 246) have been successfully connected with the selected user that appears in the primary selection field 222 (i.e., the user represented by the user image 240). Although not always required, the confirmation window 280 identifies the connected people by name (e.g., Joe Smith, Jack Spratt, and Mark Tee, who have been connected with Milton Dilbert). After the system establishes the relationships or links between the selected users, the confirmation window 280 can be closed to return the GUI 200 to its previous state (see FIG. 3).

Although the above description focuses on the selection of data objects that represent people or users, the techniques, technologies, and concepts presented here can be extended for use with other types of data objects. In certain embodiments, therefore, a drag-and-drop GUI element and/or any suitably configured interactive selection element could be used to select images, icons, or avatars that represent data objects such as files, accounts, groups, documents, pictures, tenants, organizations, teams, processes, machines, equipment, database objects, or the like. Such functionality allows the user to add a document to a group such that members of the group can easily "follow" the document to keep track of changes, revisions, etc. As another example, the user could "introduce" or connect a file to one or more users and/or establish a relationship between two files, via the "Connect" feature.

Figure 9:
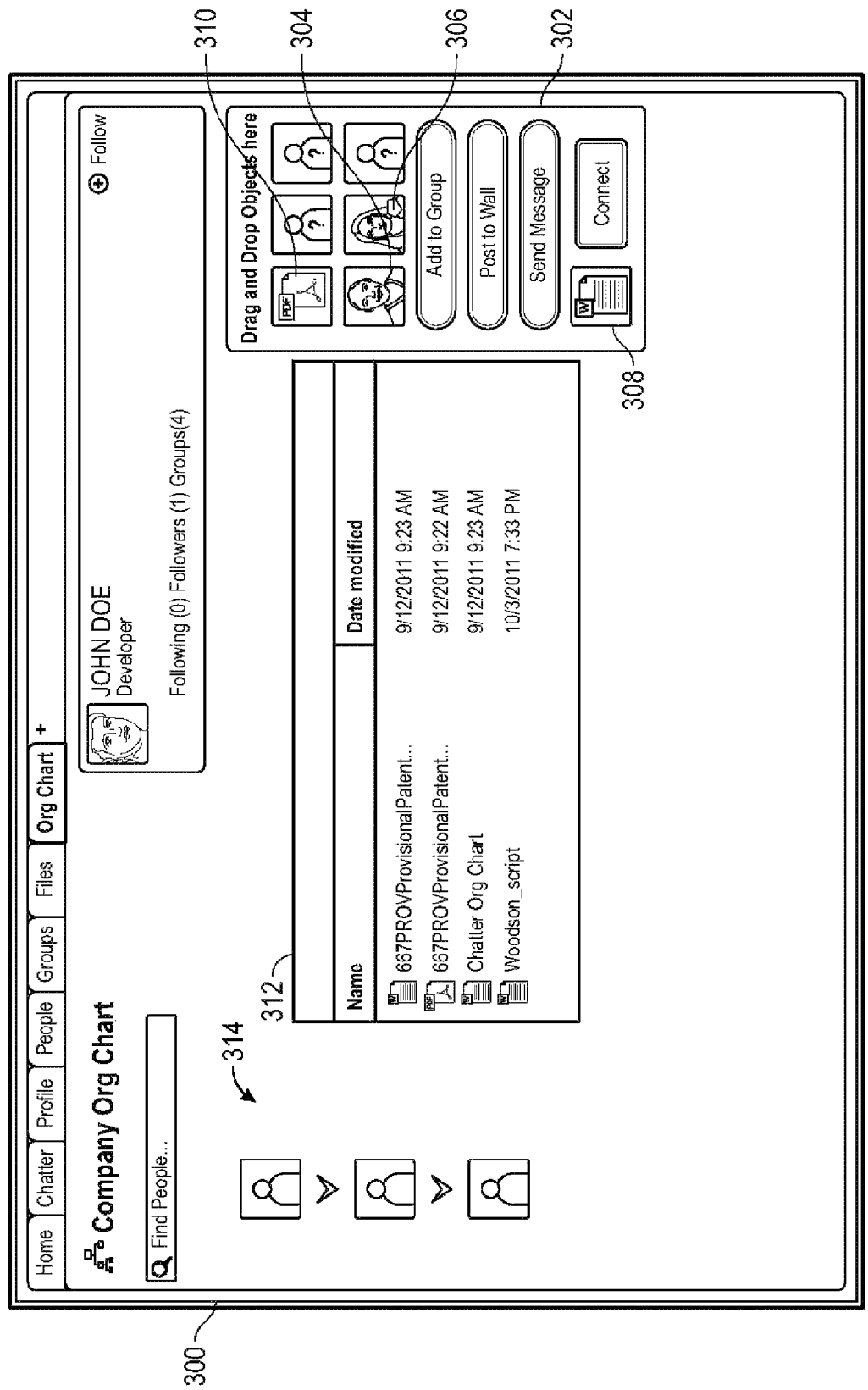

FIG. 9 depicts the state of an exemplary embodiment of a GUI 300 after certain files have been added to a drag-and-drop GUI element 302. As depicted in FIG. 9, the drag-and-drop GUI element 302 has been populated with two user images 304, 306, an icon 308 that represents a first file, and an icon 310 that represents a second file. The icons 308, 310 are preferably rendered in a way that indicates the respective file types, file extensions, or the like, as is well understood. Although the manner in which data objects are selected may vary from one embodiment to another, this example assumes that the GUI 300 provides a file selection element 312, which may appear with or in lieu of an organization chart 314. In certain embodiments, data objects identified in the file selection element 312 can be selected by dragging and dropping the corresponding entries from the file selection element 312 to the drag-and-drop GUI element 302. After the desired data objects have been selected and the drag-and-drop GUI element 302 has been populated, one or more functions or operations can be initiated as described above. It should be appreciated that a function may act upon, process, modify, or otherwise handle the selected data object(s) as needed.

Figure 10:
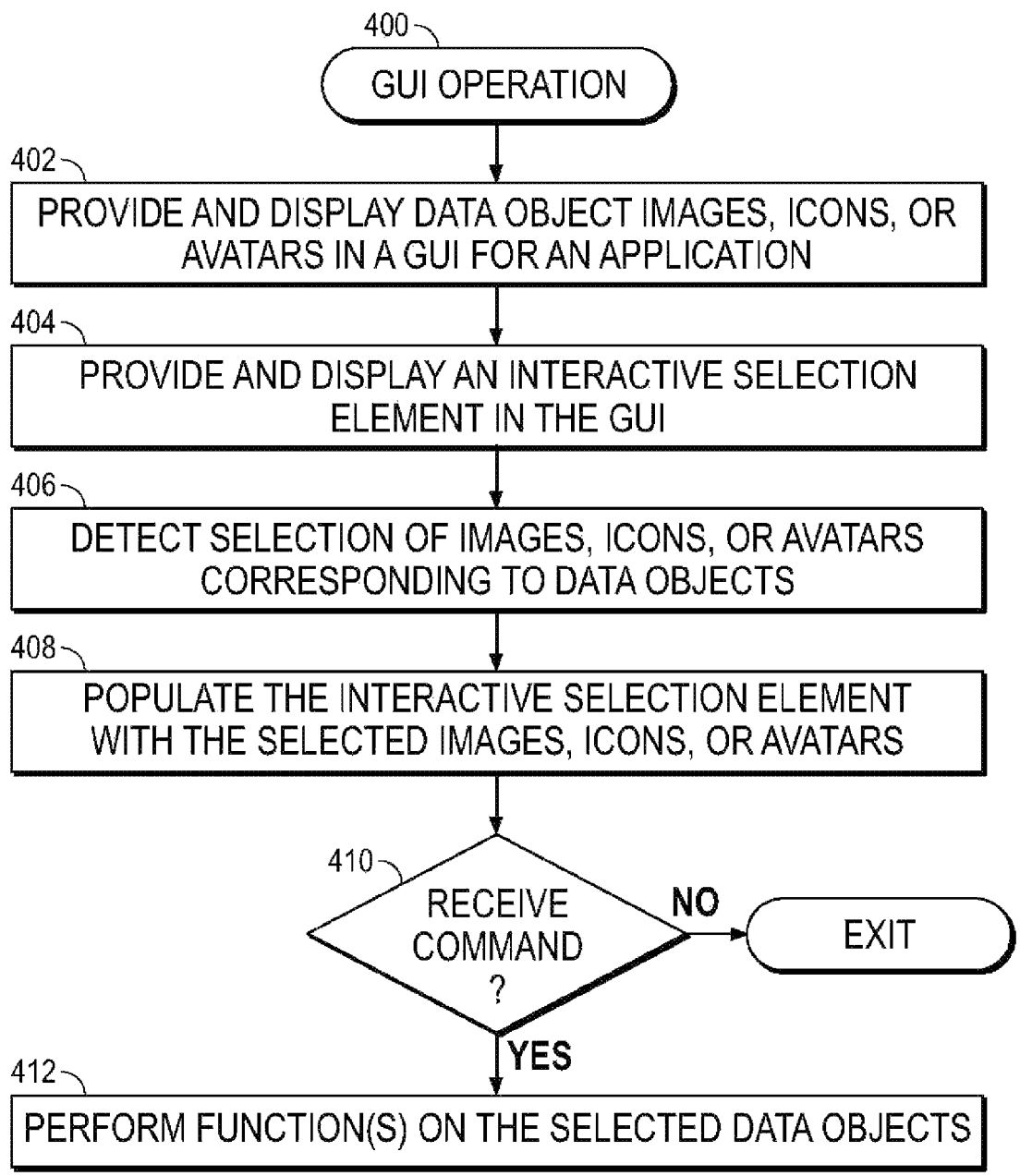
FIG. 10 is a flow chart that illustrates an exemplary embodiment of a process related to the operation of a GUI that includes an interactive data object selection element.

FIG. 10 is a flow chart that illustrates an exemplary embodiment of a process 400 related to the operation of a GUI. The process 400 represents one example of a computer-implemented method of managing functions for objects associated with an interactive application presented on a display, e.g., a hosted virtual application having a plurality of different users. The process 400 may be implemented and performed by any suitably configured computer-based system, such as the multi-tenant application system 100 (see FIG. 1). The various tasks performed in connection with an illustrated process may be performed by software, hardware, firmware, or any combination thereof. For illustrative purposes, the following description of illustrated processes may refer to elements mentioned above in connection with FIGS. 1-9. Portions of a described process may be performed by different elements of the system, e.g., a processor, and application platform, a virtual application, a client device, or any functional or operating module thereof. It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the described process as long as the intended overall functionality remains intact.

The following description of certain processes may also refer to the various states of the GUI 200 shown in FIGS. 2-8. In practice, the GUIs can be rendered on a display element of a computer device, e.g., a desktop computer monitor, the display of a handheld electronic device, the display of a tablet computing device, the display of a mobile telephone, or the like. Although not always required, the GUIs may be realized as web pages, and certain graphical features of the GUIs may be provided, generated, or otherwise implemented using scripts, plug-in components, or other elements that cooperate with web pages.

Referring again to FIG. 10, the process 400 can be initiated by a user of a client device to cause a virtual application to provide, present, or otherwise display a suitable GUI. In connection with the generation and rendering of the GUI, the process provides, for rendering on a display, images that represent different selectable data objects (task 402). The process also provides, for rendering on the display, an interactive selection element in the GUI (task 404). In accordance with the exemplary embodiment depicted in FIGS. 2-8, the data objects correspond to users of the system, and the interactive selection element is realized as a drag-and-drop GUI element that accommodates drag-and-drop selection from the plurality of images.

The process 400 continues by detecting the selection (e.g., dragging and dropping) of one or more images that correspond to the selectable data objects (task 406), and by populating the interactive selection element with the selected images (task 408). After the selection element has been populated with at least one image, the process 400 may receive a command in response to activation of a control element that is rendered with the interactive selection element (the "Yes" branch of query task 410). In response to receiving this command, the process 400 initiates or performs one or more functions on the selected data objects (task 412). As mentioned previously, the particular functions available to the user of the system may vary from one embodiment to another, and the exemplary embodiment supports at least the "Add To Group" function, the "Post To Wall" function, and the "Connect" function. Referring again to query task 410, if no command is received, then the process 400 may exit, wait until receiving a command, or return to an appropriate point to continue as described above.

Figure 11:
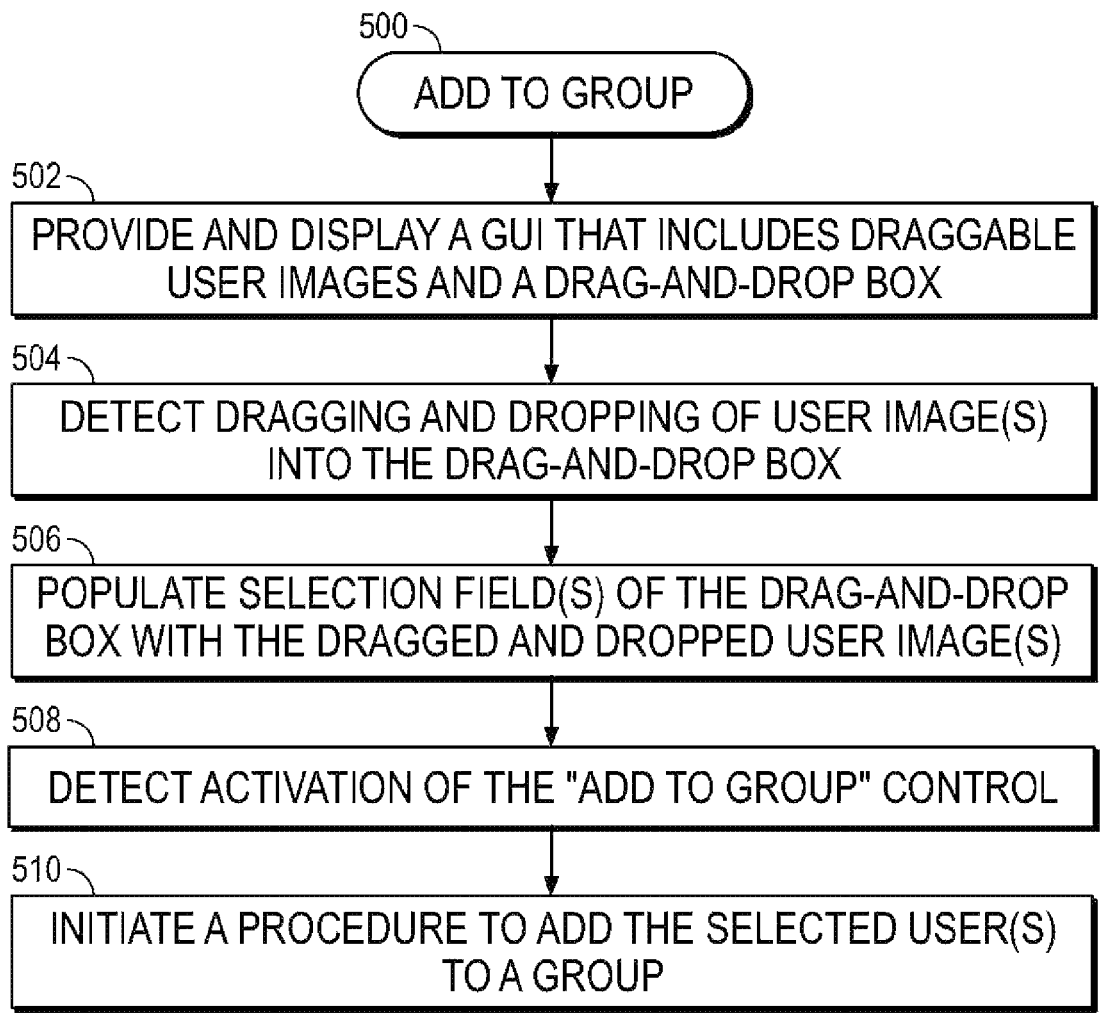
FIG. 11 is a flow chart that illustrates an exemplary embodiment of an "Add To Group" process associated with the operation of a GUI.

Referring now to FIG. 11, an exemplary embodiment of an "Add To Group" process 500 is depicted as a flow chart. In connection with the process 500, the system provides and displays a GUI that includes draggable user images and a drag-and-drop GUI element (task 502). The process 500 detects the dragging and dropping of one or more user images into the drag-and-drop GUI element (task 504) and, in response to the dragging and dropping, updates and populates the selection fields(s) of the drag-and-drop GUI element to include the selected user images (task 506). Thereafter, the process 500 detects the activation of a control element associated with the drag-and-drop GUI element, e.g., an "Add To Group" control (task 508). The command or instruction resulting from the activation of the "Add To Group" control is received and processed to initiate a procedure to add the selected user(s) to a designated group of users that is maintained by the hosted virtual application (task 510). Task 510 may be associated with the generation and operation of the GUIs described above with reference to FIG. 4 and FIG. 5.

Figure 12:
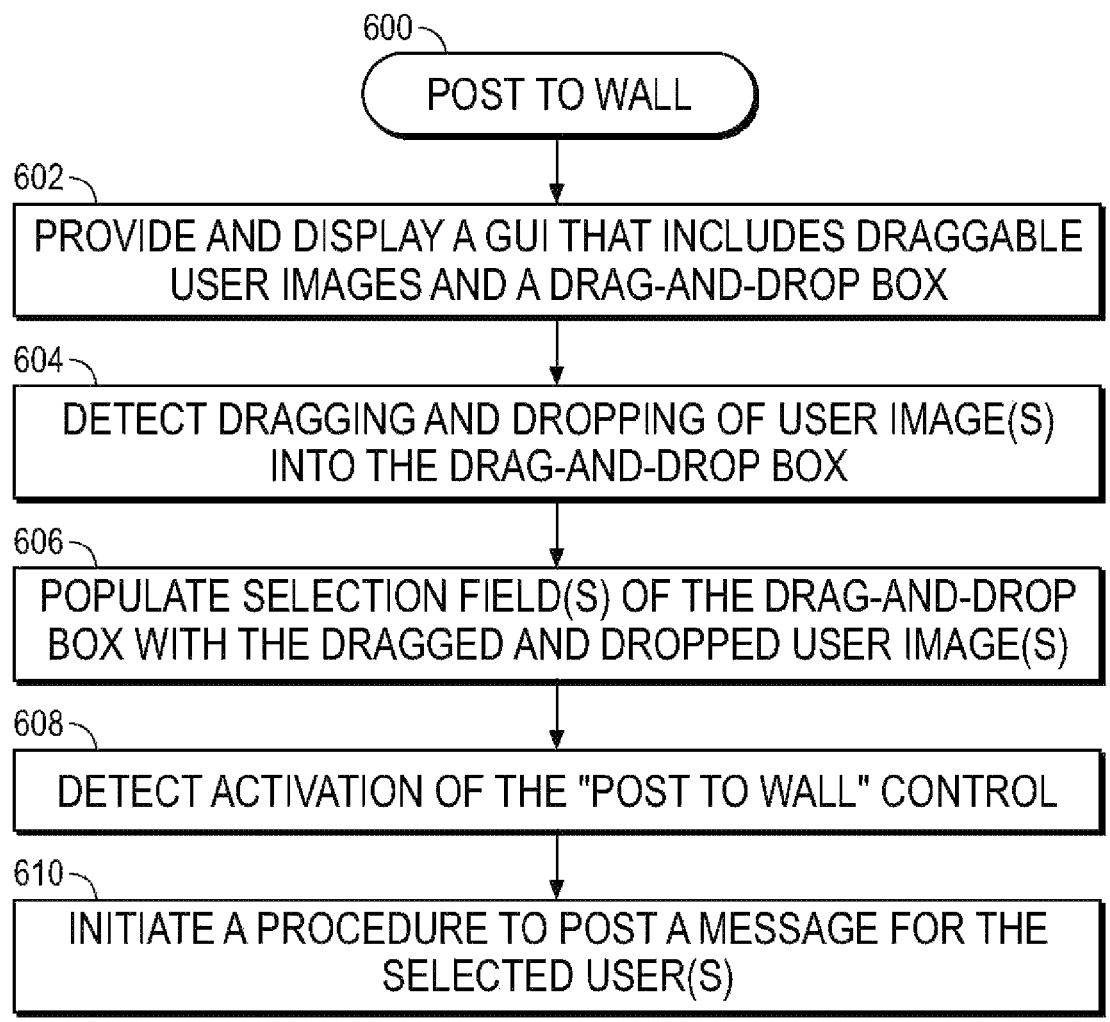
FIG. 12 is a flow chart that illustrates an exemplary embodiment of a "Post To Wall" process associated with the operation of a GUI.

Referring now to FIG. 12, an exemplary embodiment of a "Post To Wall" process 600 is depicted as a flow chart. In connection with the process 600, the system provides and displays a GUI that includes draggable user images and a drag-and-drop GUI element (task 602). The process 600 detects the dragging and dropping of one or more user images into the drag-and-drop GUI element (task 604) and, in response to the dragging and dropping, updates and populates the selection fields(s) of the drag-and-drop GUI element to include the selected user images (task 606). Thereafter, the process 600 detects the activation of a control element associated with the drag-and-drop GUI element, e.g., a "Post To Wall" control (task 608). The command or instruction resulting from the activation of the "Post To Wall" control is received and processed to initiate a procedure to post a message that is intended for the selected users (task 610). Task 610 may be associated with the generation and operation of the GUIs described above with reference to FIG. 6 and FIG. 7.

A process similar to the "Post To Wall" process 600 may also be supported to send a private message or an instant message to selected user(s), or to create a live chat "room" intended for the selected user(s). In this regard, tasks 602, 604, and 606 can be performed as described above to populate the drag-and-drop GUI element with the desired user images. Thereafter, an appropriate control element (such as the "Send Message" control 229 depicted in FIGS. 2-9) is activated to initiate a procedure to send a private message to the selected users, send an instant message to the selected users, invite the selected users to join a live chat room, or the like.

Figure 13:
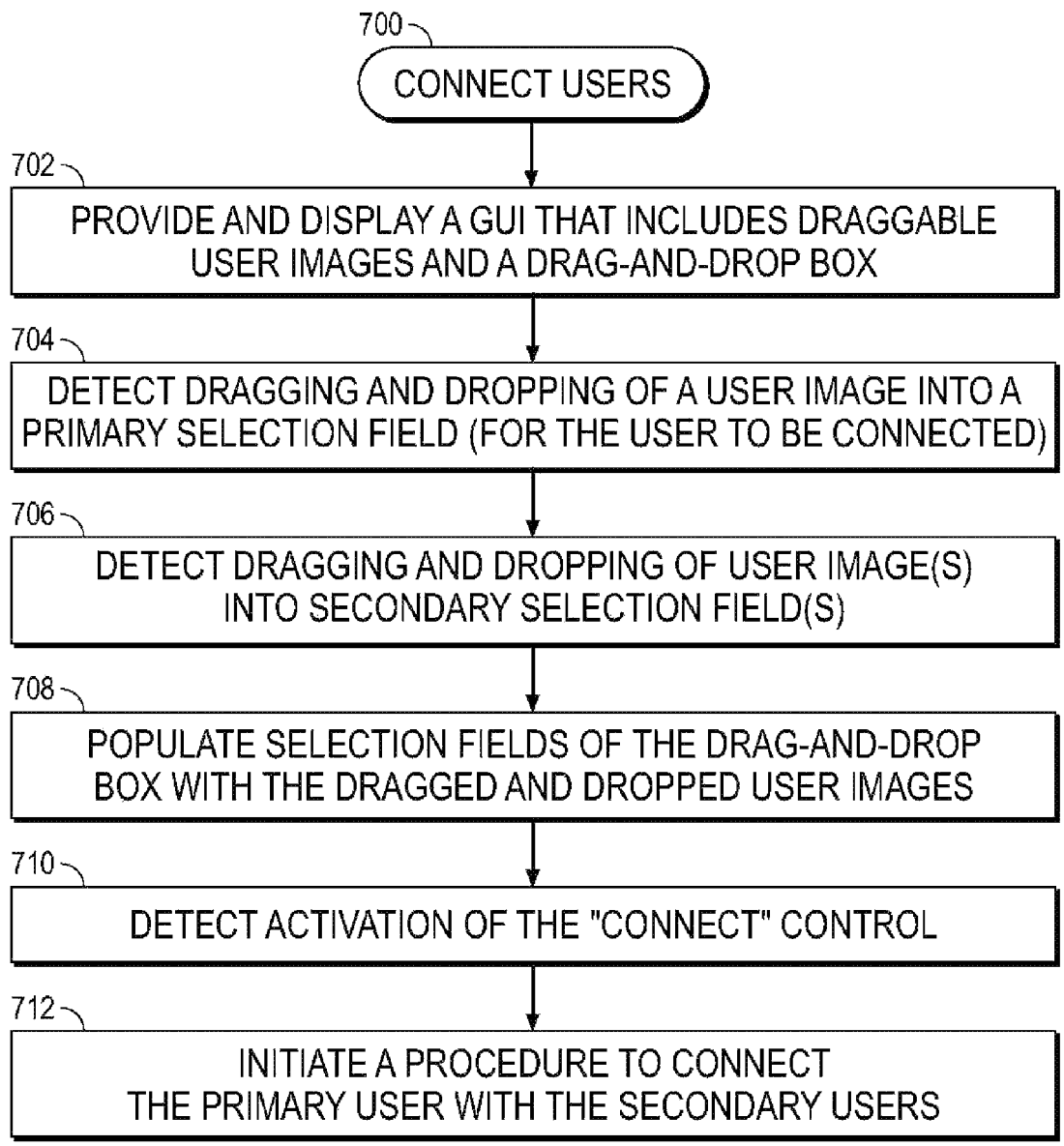
FIG. 13 is a flow chart that illustrates an exemplary embodiment of a "Connect Users" process associated with the operation of a GUI.

Referring now to FIG. 13, an exemplary embodiment of a "Connect Users" process 700 is depicted as a flow chart. In connection with the process 700, the system provides and displays a GUI that includes draggable user images and a drag-and-drop GUI element (task 702). The process 700 detects the dragging and dropping of one user image into a solitary or primary selection field, which is intended for the user or person "to be connected" to one or more other users (task 704). The process 700 also detects the dragging and dropping (task 706) of one or more user images into the secondary selection field(s), which are utilized to identify the user(s) to be introduced to the user identified in the primary selection field. In response to the dragging and dropping actions, the process 700 updates and populates the selection fields(s) of the drag-and-drop GUI element to include the selected user images (task 708). Thereafter, the process 700 detects the activation of a control element associated with the drag-and-drop GUI element, e.g., a "Connect" control (task 710). The command or instruction resulting from the activation of the "Connect" control is received and processed to initiate a procedure to connect the selected users to one another (task 712). Task 710 may be associated with the generation and operation of the GUI described above with reference to FIG. 8.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method of managing functions for objects associated with an interactive application presented on a display, the method comprising:
   providing, for rendering in a graphical user interface (GUI) page on the display, a plurality of images that represent different selectable objects;
   providing, for rendering in the GUI page on the display, a drag-and-drop GUI element to accommodate drag-and-drop selection from the plurality of images, the drag-and-drop GUI element comprising a solitary drag-and-drop GUI field that accommodates selection of only one of the plurality of images at a time, a multiple drag-and-drop GUI field that accommodates selection of more than one of the plurality of images at a time, and a plurality of control elements to initiate functions, wherein the plurality of control elements comprises:
   an "Add To Group" control that, when activated, initiates a procedure to add at least one of the different selectable objects to a designated group;
   a "Post To Wall" control that, when activated, initiates a procedure to post a message intended for at least one of the different selectable objects; and
   a "Connect" control that, when activated, initiates a procedure to connect selectable objects to one another;
   populating the drag-and-drop GUI element with at least one of the plurality of images;
   changing activation characteristics of the plurality of control elements in response to a population state of the solitary drag-and-drop GUI field and the multiple drag-and-drop GUI field, wherein the activation characteristics dictate whether each control element of the plurality of control elements is configured to be active or inactive;
   after populating the drag-and-drop GUI element with the at least one of the plurality of images, receiving a command in response to user interaction with a control element configured in an active state; and
   in response to receiving the command, performing a function corresponding to the control element configured in an active state.

2. The method of claim 1, wherein the plurality of images represent users, files, accounts, groups, documents, pictures, tenants, organizations, teams, processes, machines, equipment, or a database object.

3. The method of claim 1, wherein changing activation characteristics of the plurality of control elements comprises:
   configuring the plurality of control elements to have first activation characteristics when the solitary drag-and-drop GUI field is populated and the multiple drag-and-drop GUI field is unpopulated;
   configuring the plurality of control elements to have second activation characteristics when the solitary drag-and-drop GUI field is unpopulated and the multiple drag-and-drop GUI field is populated; and
   configuring the plurality of control elements to have third activation characteristics when the solitary drag-and-drop GUI field is populated and the multiple drag-and-drop GUI field is populated.

4. The method of claim 1, wherein:
   the populating comprises populating the solitary drag-and-drop GUI field with a first image that represents a first selectable object, and populating the multiple drag-and-drop GUI field with a second image that represents a second selectable object; and
   performing the function comprises initiating a procedure to connect the first selectable object to the second selectable object.

5. The method of claim 1, wherein:
   populating the drag-and-drop GUI element comprises populating the solitary drag-and-drop GUI field with a first image, and populating the multiple drag-and-drop GUI field with a second image that represents a second selectable object and with a third image that represents a third selectable object; and
   performing the function comprises initiating a procedure to connect the first selectable object to the second selectable object, and to connect the first selectable object to the third selectable object.

6. The method of claim 1, wherein:
   the plurality of images represent people related to one another in accordance with a hierarchical structure; and providing the plurality of images comprises arranging the plurality of images in accordance with the hierarchical structure.

7. The method of claim 1, wherein the interactive application is a social networking application.

8. A computer-implemented method of managing functions for users of a hosted virtual application rendered in a graphical user interface (GUI) presented on a display, the method comprising:
providing a plurality of user images for display in the GUI, each of the user images representing one of the users of the hosted virtual application;
providing an interactive user selection element for display in the GUI, the interactive user selection element comprising a solitary selection field that accommodates selection of only one of the plurality of user images at a time, a multiple selection field that accommodates selection of more than one of the plurality of user images at a time, and a plurality of control elements to initiate functions supported by the hosted virtual application;
detecting selection of at least some of the user images, to obtain selected user images;
updating the interactive user selection element to include the selected user images in the selection fields;
changing activation characteristics of the plurality of control elements in response to a population state of the solitary selection field and the multiple selection field, wherein the activation characteristics dictate whether each control element of the plurality of control elements is configured to be active or inactive, and wherein the changing results in at least one of the plurality of control elements configured an active state;
thereafter, receiving a command in response to activation of a control element configured in an active state; and
in response to receiving the command, initiating a function for selected users represented by the selected user images;
wherein the plurality of control elements comprises:
an "Add To Group" control that, when activated, initiates a procedure to add the selected users to a group of users maintained by the hosted virtual application;
a "Post To Wall" control that, when activated, initiates a procedure to post a message intended for the selected users; and
a "Connect" control that, when activated, initiates a procedure to connect the selected users to one another.

9. The method of claim 8, wherein the user images and the interactive user selection element are concurrently displayed in the GUI.

10. The method of claim 8, wherein:
the solitary selection field accommodates selection of a to-be-connected user, and the multiple selection field accommodates selection of designated users other than the to-be-connected user; and
initiating the function comprises initiating a procedure to introduce the to-be-connected user to the designated users.

11. The method of claim 8, wherein providing the plurality of user images comprises displaying at least a portion of a personnel directory that includes the user images.

12. The method of claim 8, wherein the interactive user selection element further comprises a data object selection field, and wherein the method further comprises:
detecting selection of a data object, resulting in a selected data object;
updating the interactive user selection element to include a graphical icon in the data object selection field, the graphical icon representing the selected data object.

13. The method of claim 12, wherein the function acts upon the selected data object.

14. A computer system comprising a processor and a memory, wherein the memory comprises computer-executable instructions that, when executed by the processor, cause the computer system to:
provide a graphical user interface (GUI) for an application that handles data objects, the GUI comprising a plurality of selectable images that represent corresponding data objects, and comprising a multifunction drag-and-drop selection element having a solitary selection field that accommodates selection of only one of the plurality of selectable images at a time, a multiple selection field that accommodates selection of more than one of the plurality of selectable images at a time, and a plurality of control elements to initiate functions supported by the application;
receive a selection command associated with dragging and dropping at least one of the selectable images into the multifunction drag-and-drop selection element, to obtain at least one selected data object;
change activation characteristics of the plurality of control elements in response to a population state of the solitary selection field and the multiple selection field, wherein the activation characteristics dictate whether each control element of the plurality of control elements is configured to be active or inactive, and wherein the changing results in at least one of the plurality of control elements configured an active state;
receive a control command associated with activation of a control element configured in an active state; and
in response to receiving the control command, initiating a function in connection with the at least one selected data object;
wherein the plurality of control elements comprises:
an "Add To Group" control that, when activated, initiates a procedure to add the at least one selected data object to a group maintained by the application;
a "Post To Wall" control that, when activated, initiates a procedure to post a message intended for the at least one selected data object; and
a "Connect" control that, when activated, initiates a procedure to connect one selected data object to another selected data object.

15. The computer system of claim 14, wherein:
the computer system is configured as a multi-tenant architecture to support a plurality of different tenants; and
the application is a hosted virtual application for one of the plurality of tenants.

16. The computer system of claim 14, wherein the plurality of selectable images represent data objects chosen from: user objects; file objects; account objects; group objects; document objects; picture objects; tenant objects, organization objects, team objects, process objects, machine objects, equipment objects, or database objects.

17. The computer system of claim 14, wherein the function initiated by the multifunction drag-and-drop selection element and the control element configured in an active state is chosen from: a procedure to add the at least one selected data object to a designated group; a procedure to post a message intended for the at least one selected data object; or a procedure to establish a link associated with the at least one selected data object.

* * * * *